US008809221B2

(12) United States Patent
Patil et al.

(10) Patent No.: US 8,809,221 B2
(45) Date of Patent: Aug. 19, 2014

(54) NITROGEN CONTAINING EXTERNAL DONOR SYSTEM FOR PROPYLENE POLYMERIZATION

(75) Inventors: Harshad Ramdas Patil, Gujarat (IN); Priyanshu Bharatkumar Vyas, Gujarat (IN); Virendrakumar Gupta, Maharashtra (IN)

(73) Assignee: Reliance Industries Limited (IN)

( * ) Notice: Subject to any disclaimer, the term of this patent is extended or adjusted under 35 U.S.C. 154(b) by 0 days.

(21) Appl. No.: 14/116,467

(22) PCT Filed: May 7, 2012

(86) PCT No.: PCT/IN2012/000334
§ 371 (c)(1),
(2), (4) Date: Nov. 8, 2013

(87) PCT Pub. No.: WO2012/164574
PCT Pub. Date: Dec. 6, 2012

(65) Prior Publication Data
US 2014/0155560 A1    Jun. 5, 2014

(30) Foreign Application Priority Data

May 9, 2011    (IN) .......................... 1424/MUM/2011

(51) Int. Cl.
| | | |
|---|---|---|
| B01J 31/00 | (2006.01) |
| B01J 37/00 | (2006.01) |
| B01J 27/24 | (2006.01) |
| C08F 4/02 | (2006.01) |
| C08F 4/60 | (2006.01) |
| C08F 4/44 | (2006.01) |
| C08F 4/06 | (2006.01) |
| C08F 2/00 | (2006.01) |
| C08F 2/04 | (2006.01) |

(52) U.S. Cl.
USPC ........... 502/123; 502/167; 502/200; 526/141; 526/147; 526/217; 526/236; 526/351

(58) Field of Classification Search
CPC ............ B01J 31/00; B01J 37/00; B01J 27/24; C08F 4/02; C08F 4/60; C08F 4/44; C08F 4/06; C08F 2/00; C08F 2/04

USPC .......... 502/123, 167, 200; 526/141, 147, 217, 526/236

See application file for complete search history.

(56) References Cited

U.S. PATENT DOCUMENTS

| 4,107,415 A * | 8/1978 | Giannini et al. ............... 526/114 |
| 5,854,164 A | 12/1998 | Shiraishi et al. |
| 2005/0043494 A1 | 2/2005 | Goodall et al. |
| 2005/0277569 A1 | 12/2005 | Goodall et al. |
| 2005/0277749 A1 | 12/2005 | Goodall |
| 2006/0252894 A1 | 11/2006 | Thorman et al. |
| 2006/0270811 A1 | 11/2006 | Shen et al. |
| 2009/0118115 A1 | 5/2009 | Amirzadeh-Asl |

FOREIGN PATENT DOCUMENTS

| EP | 0309140 A1 | 3/1989 | |
| EP | 309140 A1 * | 3/1989 | ................ C08F 4/64 |
| WO | WO-2009/141831 A2 | 11/2009 | |
| WO | WO 2009141831 A2 * | 11/2009 | .............. C08F 10/06 |
| WO | WO-2012/164574 A1 | 12/2012 | |

OTHER PUBLICATIONS

"International Application Serial No. PCT/IN2012/000334, International Preliminary Report on Patentability mailed Nov. 21, 2013", 5 pgs.
"International Application Serial No. PCT/IN2012/000334, Written Opinion mailed Oct. 23, 2012", 3 pgs.
"International Application Serial No. PCT/IN2012/000334, International Search Report mailed Oct. 23, 2012", 2 pgs.

* cited by examiner

*Primary Examiner* — David W Wu
(74) *Attorney, Agent, or Firm* — Schwegman Lundberg & Woessner, P.A.

(57) ABSTRACT

The present invention discloses new class of nitrogen containing external donor systems. These donor systems are used in titanium supported on magnesium dichloride pro-catalyst system for polymerization of propylene. The external donor systems of the present invention in combination with silane show the kinetics control for diester catalyst polymerization process along with stereo regularity control of product. The polypropylene produced using nitrogen containing external donor systems of the present invention have broad molecular weight distribution.

12 Claims, No Drawings ized polyethylene) and injection molding grades.

NITROGEN CONTAINING EXTERNAL DONOR SYSTEM FOR PROPYLENE POLYMERIZATION

PRIORITY CLAIM TO RELATED APPLICATIONS

This application is a U.S. National Stage Application under 35 U.S.C. §371 of PCT/IN2012/000334, filed May 7, 2012, and published as WO 2012/164574 A1 on Dec. 6, 2012, which claims priority to Indian Application No. 1424/MUM/2011, filed May 9, 2011, which applications and publication are incorporated by reference as if reproduced herein and made a part hereof in their entirety, and the benefit of priority of each of which is claimed herein.

FIELD OF INVENTION

The present invention relates to nitrogen containing external donor systems for magnesium dichloride supported titanium or Ziegler Natta (ZN) pro-catalyst system. These nitrogen containing external donor systems are used with diester and monoester based internal donor catalyst systems for polymerization of propylene. The disclosed external donor systems are used in combination with silane for kinetics control and/or stereo regularity control for diester based internal donor catalyst. The present invention is further directed to use of nitrogen containing external donor PMDETA (penta methyl diethyl tetra amine or) for monoester based internal donor catalyst. The polypropylene produced using nitrogen containing external donor has broad molecular weight distribution which is desirable for BOPP (Biaxailly orinted polypropylene) and injection molding grades.

BACKGROUND OF INVENTION

Polymerization of propylene is carried out in presence of catalyst system consisting of titanium supported on magnesium dichloride (Ziegler Natta) carrying internal donor, an organo aluminium co-catalyst and an external electron donor. Type of internal donor used in pro-catalyst synthesis governs type of external donor to be used during polymerization process along with the co-catalyst.

Diesters and monoesters based catalyst are well known and often used for polymerization of propylene. Diester catalyst systems along with silane as external donor are not self extinguishing in nature which is critical for fluidized bed gas phase polymerization. This means activity of catalyst increases with increasing polymerization temperature leading to lump formation in reactor. Recently oxygen containing kinetics modifier mixtures along with silane are used which controls the activity of catalyst system. However, there is further scope to improve the kinetics control of diester catalyst system using new class of kinetics modifiers.

The molecular weight distribution of polypropylene produced using diester catalyst with silane as external donor is narrow compared to the molecular weight distribution of polypropylene produced using monoester catalyst system. It is desirable to have broad molecular weight distribution for a few applications like BOPP or injection molding homo grades. Therefore, it is desired to have a catalyst system which produces broad molecular weight distribution at similar stereospecificity and melt flow index level for diester catalyst systems along with controlled kinetics of polymerization. Monoester catalyst systems have low to medium polymerization activity with inherent self extinguishing characteristics. Oxygen containing external donors are widely used for polymerization of propylene for monester catalyst. It is also desirable to find new type of external donor system for monoester catalyst.

US 2009/0118115A1 discloses the use of oxygen containing external donors as polymerization kinetics modifiers with silane for controlling the kinetics of polymerization in diester catalyst system. US20060270811A1, US20050277749A1, US20050277569A1, US20050043494A1 disclose use of PMDETA as a ligand for bimetallic catalyst composition which is quite different as compared to the magnesium dichloride supported Titanium catalyst (ZN) system. US20060252894A1 teaches the use of tetra methyl ethylene diamine as one of the internal donors but with a different novelty. U.S. Pat. No. 5,854,164 discloses the use of cyclic organic nitrogen containing external donor such as derivatives of piperidine, pyrolidine, amines, amides etc for polymerization of propylene using monoester catalyst system, however the claimed compound has not been, studied with monoester catalyst system.

Thus, there is need to develop a new class of external donors for diester as well as monoester catalyst system which provides advantage in product characteristics.

OBJECTS OF THE INVENTION

The primary object of the present invention is to disclose a new class external donor for diester and monoester based Ziegler Natta (ZN) pro-catalyst system for use in polymerization of propylene to produce polypropylene.

Another object of the present invention is to disclose an external donor system which provides broad molecular weight distribution of polypropylene.

Still another object of the present invention is to disclose an external donor system which in combination with silane exhibits kinetics control along with stereo regularity control for diester catalyst system.

Yet another object of the present invention is to disclose an external donor system for monoester based internal donors.

Another object of the present invention is to disclose external donor system for preparing polypropylene which is desirable for film grade.

Still another object of the present invention is to disclose a method of polymerization of propylene using the disclosed external donor system and ester internal donor.

SUMMARY OF THE INVENTION

The present invention provides a catalyst system for polymerization of propylene comprising a: (a) titanium supported magnesium dichloride procatalyst carrying internal donor; (b) organoaluminium cocatalyst and; (c) external donor comprising pentamethyldiethyltriamine and an alkoxy silane.

In another embodiment the present invention provides a catalyst system wherein the titanium supported magnesium dichloride procatalyst comprises 2.0 to 3.4 wt % Ti, 17 to 18 wt % Mg, 13 to 18 wt % ethylbenzoate, 8-16 wt % diisobutyl phthalates and 0.1 to 0.5 wt % ethoxy.

In yet another embodiment the present invention provides a catalyst system wherein the aluminium in the organoaluminium cocatalyst to external electron donor molar ratio is in the range of 3 to 6 and aluminium to titanium molar ratio is in the range of 40 to 260.

In still another embodiment the present invention provides a catalyst system wherein the internal donor is a monocarboxylic acid ester or dicarboxylic acid ester.

In another embodiment the present invention provides a catalyst system wherein the monocarboxylic acid ester is ethyl benzoate and the dicarboxylic acid ester is diisobutyl phthalate.

In still another embodiment the present invention provides a catalyst system wherein the organoaluminium cocatalyst is triethyl aluminium.

In yet another embodiment the present invention provides a catalyst system wherein the molar ratio of pentamethyldiethyltriamine to silane is in the range of 30:70 to 70:30.

In another embodiment the present invention provides a catalyst system wherein the molar ratio of pentamethyldiethyltriamine to silane is 50:50.

In still another embodiment the present invention provides a catalyst system wherein the silane is selected from the group comprising n-propyl trimethoxy silane, dicyclopentyl dimethoxy silane or cyclohexyl methyl dimethoxy silane.

In another embodiment the present invention provides a process of polymerizing propylene using the catalyst system disclosed herein comprising contacting propylene with the catalyst.

In yet another embodiment the present invention provides a process of polymerizing propylene wherein the process is performed in gas phase or slurry phase.

DETAILED DESCRIPTION OF THE INVENTION

The present invention provides a catalyst system for polymerization of propylene. The present invention discloses control of kinetics of polymerization by using nitrogen containing external donor system along with silane for diester catalyst system. This is reflected by comparatively lower productivity of mixed donor system and stereo control of polypropylene. Broad molecular weight distribution (desirable for application like BOPP) of polypropylene is achieved using nitrogen containing external donor system of the present invention along with silane compared to that achieved when silane is used alone as external donor in diester catalyst system.

The nitrogen containing external donor of the present invention shows medium activity with monoester catalyst. The polypropylene produced has broad molecular weight distribution compared to polypropylene produced using oxygen containing external donor with monoester catalyst.

In the present invention procatalyst (titanium supported on magnesium dichloride supported catalyst system with internal donor having ester or diester functional group), co-catalyst and disclosed external donor (single or mixed with silane) are added and contacted with monomer and hydrogen in gas phase or slurry phase. In the catalyst system of the present invention the titanium supported magnesium dichloride procatalyst comprises 2.0 to 3.4 wt % Ti, 17 to 18 wt % Mg, 13 to 18 wt % ethylbenzoate, 8-16 wt % diisobutyl phthalates and 0.1 to 0.5 wt % ethoxy. The molar ratio of aluminium to external electron donor is in the range of 3 to 6 and aluminium to titanium molar ratio is in the range of 40 to 260; and the molar ratio of pentamethyldiethyltriamine and silane is in the range of 30:70 to 70:30.

The external donor of the present invention with silane modify steric and/or electronic characteristics of active sites leading to control of polymerization activity of diester catalyst by varying the stability of active sites. This creates more types of active sites leading to broad molecular weight distribution.

The external donor of the present invention as single donor has compatibility to replace internal donor for monoester catalyst as shown by medium scale activity. It also creates more types of active sites giving broad molecular weight Polypropylene.

The present invention is illustrated and supported by the following examples. These are merely representative examples and optimization details and are not intended to restrict the scope of the present invention in any way.

Example 1

Polymerization Study of PMDETA, n-Propyl Trimethoxy Silane (NPTMS) and Dicyclopentyl Dimethoxy Silane (DCPDMS) as Single Donor and Silane (NPTMS, DCPDMS)/PMDETA as Dual External Donor with Diester Catalyst Bench scale slurry polymerization was carried out in a preheated moisture free stainless steel jacketed 4 L stirred tank reactor having a magnetic stirrer. Magnesium dichloride supported ethyl benzoate containing titanium tetrachloride catalyst (procatalyst), triethyl aluminium cocatalyst and external donor(s) in Table-1 were added into dry n-hexane. Procatalyst and cocatalyst were added to have TEAl/Ti mole ratio of 250±10 and a TEAl/Donor mole ratio of 3 to 30. 240 ml of hydrogen was added into the reactor. Reactor temperature of 70±2° C. and a reactor pressure of 5.0±0.2 kg/cm$^2$ was maintained for reaction time of 2 hr. After 2 hr of reaction, hexane was removed and polymer was collected and dried. Productivity of catalyst was calculated based on polymer yield and amount of catalyst used. The polymerization performance and polymer characteristics are reported in Table 1.

TABLE 1

| Donor system | TEAl/Donor (Mole ratio) ±0.1 (for 3) & ±1 (for 30) | Productivity (Kg PP/gm cat) ±0.1 | Xylene Soluble (wt %) ±0.1 | Melt Flow index (gm/10 min) ±0.1 |
|---|---|---|---|---|
| PMDETA [I] | 3 | 0.5 | 3.5 | 1.2 |
| NPTMS [II] | 30 | 6.6 | 6.5 | 4.6 |
| DCPDMS | 30 | 12.0 | 1.2 | 1.0 |
| NPTMS + PMDETA (50:50) [III] | 3 | 2.1 | 3.7 | 5.1 |
| DCPDMS + PMDETA (50:50) | 3 | 5.9 | 3.3 | 0.8 |

Results indicate that PMDETA as single donor has more control on polymerization kinetics. The mixed donor system, NPTMS+PMDETA and DCPDMS+PMDETA, show control on polymerization kinetics compared to single silane (like NPTMS, DCPDMS). The mixed system also shows control on stereo-regularity and melt flow index.

Example 2

Molecular Weight Study of NTPMS and Dual External Donor (NPTMS+PMDETA, 50:50 Mole) with Diester Catalyst Molecular weight distribution of polypropylene was determined with a gel permeation chromatograph series PL 220 supplied by Polymerlab equipped with PLGEL 10 micron MIXED-B 300×7.5 mm (3 columns), a differential refractive index and viscometric detector. The operating temperature of the instrument was set at 160° C. Eluting solvent was 1,2,4 trichlorobenzene. The calibration was done using known molecular weight polystyrene having molecular weight from 600 to 3 million g/gmol. The results are depicted in Table-2

TABLE-2

| S. No | Details | Sr No in Ex-1 | $M_n \times 10^{-4}$ | $M_w \times 10^{-5}$ | $M_z \times 10^{-6}$ | PDI ± 0.2 |
|---|---|---|---|---|---|---|
| 1 | NPTMS | I | 6.9 | 5.2 | 1.6 | 7.4 |
| 2 | PMDETA | II | 7.5 | 6.3 | 2.9 | 8.4 |
| 3 | NPTMS + PMDETA | III | 5.1 | 5.0 | 2.1 | 9.9 |

Molecular weight distribution study indicates broadening of molecular weight distribution represented by Polydispesity (ratio of $M_w$ to $M_n$) for mixed donor system (NPTMS+PMDETA) compared to single donor system (NTPMS)

Example 3

Self Extinguishing Study of Single External Donor (Silane, NTPMS) and Dual External Donor (NPTMS+PMDETA and DCPDMS+PMDETA, 50:50 Mole) with Diester Catalyst Bench scale slurry polymerization was carried out in a preheated moisture free stainless steel jacketed 4 L stirred tank reactor having a magnetic stirrer. Magnesium dichloride supported titanium tetrachloride catalyst (procatalyst), triethyl aluminium cocatalyst and external donor(s) in Table-3 were added into dry n-hexane. Procatalyst and cocatalyst were added so as to have a TEAl/Ti mole ratio of 250±10 and a TEAl/Donor mole ratio of 3±0.2. 240 ml of hydrogen was added into the reactor. Reactor temperature of 70±2, 90±2 110±2° C. (in separate experiments) and a reactor pressure of 5.0±0.2 kg/cm² were maintained throughout the reaction for 2 hr. After 2 hr of reaction, hexane was removed and polymer was collected and dried. Productivity of catalyst was calculated based on polymer yield and amount of catalyst used. The polymerization performance and polymer characteristics are reported in Table 3.

TABLE 3

| Donor system | Temp (° C.) | TEAl/Donor (Mole ratio) ±0.1 | Productivity (Kg PP/gm cat) ±0.1 | XS (wt %) ±0.1 | MFI (gm/10 min) ±0.1 |
|---|---|---|---|---|---|
| NPTMS | 70 | 3 | 2.4 | 4.2 | 5.5 |
| NPTMS | 90 | 3 | 3.1 | 4.3 | 17.0 |
| NPTMS | 110 | 3 | 1.3 | 3.0 | 23.2 |
| NPTMS + PMDETA (50:50) | 70 | 3 | 2.1 | 3.7 | 5.1 |
| NPTMS + PMDETA (50:50) | 90 | 3 | 2.5 | 3.7 | 5.1 |
| NPTMS + PMDETA (50:50) | 110 | 3 | 0.1 | — | — |
| DCPDMS + PMDETA (50:50) | 70 | 3 | 5.9 | 3.3 | 0.8 |
| DCPDMS + PMDETA (50:50) | 90 | 3 | 6.1 | 3.0 | 2.6 |
| DCPDMS + PMDETA (50:50) | 110 | 3 | 2.3 | 2.7 | 2.4 |

Results indicate that polymerization activity for mixed external donor system, NPTMS+PMDETA, shows substantial reduction compared to NPTMS on increasing polymerization temperature from 70° C. to 110° C. Greater control on polymerization kinetics can be observed due to addition of PMDETA. Similar control on polymerization kinetics is observed with DCPDMS+PMDETA.

Example 4

Polymerization Study PMDETA of with Monoester Catalyst

Bench scale slurry polymerization was carried out in a preheated moisture free stainless steel jacketed 4 L stirred tank reactor having a magnetic stirrer. Magnesium dichloride supported ethyl benzoate containing titanium tetrachloride catalyst (procatalyst), triethyl aluminium cocatalyst and external donor(s) in Table-4 were added into dry n-hexane. Procatalyst and cocatalyst were added to have TEAl/Ti mole ratio of 250±10 and a TEAl/Donor mole ratio of 5 to 30±0.1. 240 ml of hydrogen was added into the reactor. Reactor temperature of 70±2° C. and a reactor pressure of 5.0±0.2 kg/cm² was maintained for reaction time of 1 hr. After 1 hr of reaction, hexane was removed and polymer was collected and dried. Productivity of catalyst was calculated based on polymer yield and amount of catalyst used. The polymerization performance and polymer-characteristics are reported in Table 4.

TABLE 4

| Donor system | TEAl/Donor (Mole ratio) ±0.1 (for 5) & ±1 (for 15, 30) | Productivity (KgPP/gcat) ±0.1 | Xylene Soluble (wt %) ±0.1 | Melt Flow Index (gm/10 min) ±0.1 |
|---|---|---|---|---|
| PMDETA | 5 | 1.8 | 4.5 | 2.4 |
| PMDETA | 15 | 2.1 | 11.4 | 12.6 |
| PMDETA | 30 | 2.7 | 15.0 | 13.5 |

TEAL/Donor represents: mole ratio of cocatalyst to external donor, XS represents: xylene solube i.e amount of polymer soluble in xylene at 25° C. and MFI represents: melt flow index i.e measure of molten polymer viscosity/molecular weight measure indirectly.

Results indicate that PMDETA shows medium range productivity with monoester catalyst. The variation of donor amount leads to change of productivity, stereo regularity and hydrogen response.

Example 5

Molecular Weight Study of PMDETA with Monoester Catalyst

Molecular weight distribution of polypropylene was determined with a gel permeation chromatograph series PL 220 supplied by Polymerlab equipped with PLGEL 10 micron MIXED-B 300×7.5 mm (3 columns), a differential refractive index and viscometric detector. The operating temperature of the instrument was set at 160° C. Eluting solvent was 1,2,4 trichlorobenzene. The calibration was done using known molecular weight polystyrene having molecular weight from 600 to 3 million g/gmol. The results are depicated in Table-5

TABLE 5

| Donor system | $M_n \times 10^{-4}$ | $M_w \times 10^{-5}$ | $M_z \times 10^{-6}$ | PDI ±0.2 |
|---|---|---|---|---|
| PMDETA (TEAl/Donor-5) | 4.1 | 3.8 | 1.1 | 9.4 |
| PMDETA (TEAl/Donor-15) | 3.5 | 5.9 | 3.5 | 16.8 |
| PMDETA (TEAl/Donor-30) | 2.4 | 4.1 | 1.8 | 16.8 |

Wherein $M_n$ represents: number average molecular weight $M_w$ represents: weight average molecular weight and Mz represents: z-average molecular weight.

Results indicate broadening of molecular weight distribution. PDI increased with increasing TEAl/Donor mole ratio. The Main Advantage's of the Present Invention are:

1. The present invention discloses a catalyst system for polymerization of propylene comprising a new class of nitrogen containing compound with silane as an external donors which provide better control of polymerization kinetics with diester catalyst system used.
2. The nitrogen compound with silane as external donors of the present invention lead to safe fluid gas phase, polymerization thereby avoiding chunk formation in reactors during nm away or uncontrolled reaction conditions when diester catalyst system is used.
3. The nitrogen containing external donor of the present invention result in broadening the molecular weight distribution of polypropylene for both monoester and diester catalyst which is desirable for film grade.

We claim:

1. A catalyst system for polymerization of propylene comprising:
   (a) a titanium supported on magnesium dichloride procatalyst carrying an internal donor;
   (b) an organoaluminium co-catalyst; and
   (c) an external donor comprising pentamethyldiethyltriamine and an alkoxy silane.
2. The catalyst system as claimed in claim 1, wherein said titanium supported magnesium dichloride procatalyst comprises 2.0 to 3.4 wt % Ti, 17 to 18 wt % Mg, 13 to 18 wt % ethylbenzoate, 8-16 wt % diisobutyl phthalate and 0.1 to 0.5 wt % ethoxy.
3. The catalyst system as claimed in claim 1, wherein aluminium of said organoaluminium co-catalyst to external electron donor molar ratio is in the range of 40 to 260.
4. The catalyst system as claimed in claim 1, wherein said internal donor is a monocarboxylic acid ester or dicarboxylic acid ester.
5. The catalyst system as claimed in claim 4, wherein monocarboxylic acid ester is ethyl benzoate.
6. The catalyst system as claimed in claim 4, wherein dicarboxylic acid ester is diisobutyl phthalate.
7. The catalyst system as claimed in claim 1, wherein said organoaluminium cocatalyst is triethyl aluminium.
8. The catalyst system as claimed in claim 1, wherein the molar ratio of pentamethyldiethyltriamine and silane is in the range of 30:70 to 70:30.
9. The catalyst system as claimed in claim 1, wherein the molar ratio of pentamethyldiethyltriamine and silane is 50:50.
10. The catalyst system as claimed in claim 1 wherein said silane is selected from the group consisting of n-propyl trimethoxy silane, dicyclopentyl dimethoxy silane and cyclohexyl methyl dimethoxy silane.
11. A process for polymerization of propylene comprising contracting propylene with the catalyst as claimed in claim 1.
12. The process as claimed in claim 11 wherein the process is performed in slurry phase or in gas phase.

* * * * *